United States Patent
Vemuri et al.

(10) Patent No.: US 8,898,663 B2
(45) Date of Patent: Nov. 25, 2014

(54) STORAGE VISIBILITY IN VIRTUAL ENVIRONMENTS

(75) Inventors: Hari Krishna Vemuri, Pune (IN); Shailesh Vaman Marathe, Pune (IN)

(73) Assignee: Symantec Corporation, Mountain View, CA (US)

( * ) Notice: Subject to any disclaimer, the term of this patent is extended or adjusted under 35 U.S.C. 154(b) by 854 days.

(21) Appl. No.: 12/639,655

(22) Filed: Dec. 16, 2009

(65) Prior Publication Data

US 2011/0145818 A1   Jun. 16, 2011

(51) Int. Cl.
*G06F 9/455* (2006.01)
*G06F 9/46* (2006.01)
*G06F 3/06* (2006.01)

(52) U.S. Cl.
CPC ............ *G06F 3/0665* (2013.01); *G06F 3/0604* (2013.01); *G06F 3/067* (2013.01); *G06F 3/0631* (2013.01)
USPC .............................................. 718/1; 718/105

(58) Field of Classification Search
None
See application file for complete search history.

(56) References Cited

U.S. PATENT DOCUMENTS

| 7,519,745 | B2 | 4/2009 | Hashimoto |
| 7,774,391 | B1 * | 8/2010 | Le et al. ................... 707/822 |
| 8,181,174 | B2 | 5/2012 | Liu |
| 2004/0064460 | A1 * | 4/2004 | Pooni et al. .............. 707/100 |

FOREIGN PATENT DOCUMENTS

| CN | 101470621 A | 7/2009 |
| JP | 2005-222123 | 8/2005 |

OTHER PUBLICATIONS

Office Action mailed on Jul. 29, 2014 for co-pending JP Application No. 2012-544514; 4 pages (in Japanese).
Office Action mailed on Jul. 16, 2014 for co-pending CN Application No. 201080056423.5; 27 pages (in Chinese with English summary).

* cited by examiner

*Primary Examiner* — Meng An
*Assistant Examiner* — Wissam Rashid
(74) *Attorney, Agent, or Firm* — Wilmer Cutler Pickering Hale and Dorr LLP

(57) ABSTRACT

Embodiments of the present invention are directed to a method and system for making storage information available to virtual machines in virtual environments. A method includes sending a request, via an electronic system, for a plurality of storage attributes to a virtual storage access module. The virtual storage access module may facilitate access to storage for a virtual machine via a virtual access path. The method further includes receiving the plurality of storage attributes from the virtual storage access module and storing the plurality of storage attributes. In one embodiment, storing is operable to store the plurality of storage attributes such that they are available for use in storage management tasks.

20 Claims, 10 Drawing Sheets

STORAGE VISIBILITY IN VIRTUAL ENVIRONMENTS

CROSS REFERENCE TO RELATED U.S. APPLICATIONS

This application is related to the copending non-provisional patent application, Ser. No. 12/165,351, entitled "METHOD AND APPARATUS FOR PROVIDING A HOST-INDEPENDENT NAME TO IDENTIFY A META-DEVICE THAT REPRESENTS A LOGICAL UNIT NUMBER," with filing date Jun. 30, 2008, and hereby incorporated by reference in its entirety.

TECHNICAL FIELD

Embodiments of the present invention generally relate to digital computer systems with storage units.

BACKGROUND

As technology advances, data storage is increasingly important and the amount of data stored is increasing rapidly. Correspondingly, the size of data storage arrays and their demands for storage have increased rapidly. Ever increasing amounts of data are required to be highly available and protected from corruption or damage caused by any of a variety of factors, such as natural disasters and power failures, etc. As a result, increasingly complex data storage clusters are used to satisfy the demands for data storage and retrieval.

Similarly, virtualization of computers and/or operating systems has become increasingly important to enable server consolidation such that many small physical servers can be replaced by one larger physical server. This results in increased and more efficient utilization of costly hardware resources such as central processing units (CPU), thereby allowing power savings and hardware cost savings.

Virtual environments typically include virtualized computers and/or operating systems known as virtual machines which require access to storage. Access to storage is typically provided in two ways: physical access paths (e.g., direct attached dedicated adapters, network port identifier virtualization (NPIV), I/O virtualization (IOV), etc.) and virtual access paths. Physical access paths allow the virtual machine to have access to the actual physical adapter and then to the storage. With virtual access paths, a virtual input/output (I/O) server forwards I/O requests to the storage. When virtual access paths are used the virtual machine or guest sees the virtual paths and does not see the actual physical paths to storage or actual storage. That is, the details of the storage backend are hidden from the virtual machine. For example, where storage exported to virtual machines includes multiple storage enclosures, the virtual machines cannot distinguish between storage from different enclosures due to virtualization and thus will only treat the storage as coming from a single large enclosure. This virtualization of storage prevents a variety of storage management activity as specific storage device information is not made available.

Thus, a need exists to make storage information available in virtual environments when using virtual access paths such that storage management may be performed.

SUMMARY OF THE INVENTION

Accordingly, embodiments of the present invention provide systems and methods for making storage attributes available through virtual access paths in virtual environments. The availability of the storage attributes enables storage management (e.g., storage allocation) to be performed from within a virtual environment (e.g., via a virtual machine). It is appreciated that embodiments allow virtual environments to have the same storage management abilities as physical environments In one embodiment, the present invention is implemented as a method for making storage information visible in virtual environments. The method includes sending a request, via an electronic system, for a plurality of storage attributes (e.g., information about a logical unit number (LUN)) to a virtual storage access module. The virtual storage access module may facilitate access to storage for a virtual machine via a virtual access path. In one embodiment, a communication channel is established with a backend agent (e.g., a portion of a virtual input/output component) of the virtual storage access module. In another embodiment, the request comprises a plurality of storage inquiry pages which correspond to storage inquiry pages of the storage comprising the plurality storage of attributes. The storage inquiry pages may be based on a specific operating system or platform. In yet another embodiment, the request is sent to a centralized management agent operable to manage multiple managed hosts (e.g., virtual machines).

The method further includes receiving the plurality of storage attributes from the virtual storage access module (e.g., via said virtual access path) and storing the plurality of storage attributes. In one embodiment, the storage attributes are available for use in storage management tasks. In one embodiment, the method further includes presenting (e.g., via a graphical user interface (GUI)) the plurality of storage attributes for facilitating storage management of the virtual storage access module.

In one embodiment, the present invention is implemented as a computer readable storage medium having stored thereon, computer executable instructions that, if executed by a computer system cause the computer system to perform a method including sending a request, via an electronic system, for a plurality of storage attributes (e.g., information about a logical unit number (LUN)) to a virtual storage access module. The virtual storage access module may facilitate access to storage resources for a virtual machine via a virtual access path. In one embodiment, a communication channel is established with a backend agent (e.g., a portion of a virtual input/output component) of the virtual storage access module. In another embodiment, the request comprises a plurality of storage inquiry pages which correspond to storage inquiry pages of the storage resources comprising the plurality storage of attributes. The storage inquiry pages may be based on a specific operating system or platform. In yet another embodiment, the request is sent to a centralized management agent operable to manage multiple managed hosts (e.g., virtual machines).

The method of the computer readable medium further includes receiving the plurality of storage attributes from the virtual storage access module (e.g., via said virtual access path) and storing the plurality of storage attributes. In one embodiment, the storing is operable to store the plurality of storage attributes such that the plurality of storage attributes is available for use in storage management tasks. In one embodiment, the method further includes presenting (e.g., via a graphical user interface (GUI)) the plurality of storage attributes for facilitating storage management of the virtual storage access module.

In yet another embodiment, the present invention is implemented as a storage cluster system comprising a computer system having one or more processors coupled to a computer readable storage media and executing computer readable code which causes the computer system to implement a process including sending a request, via an electronic system, for a plurality of storage attributes (e.g., information about a logical unit number (LUN)) to a virtual storage access module. The virtual storage access module may facilitate access to storage for a virtual machine via a virtual access path. In one embodiment, a communication channel is established with a backend agent (e.g., a portion of a virtual input/output component) of the virtual storage access module. In another embodiment, the request comprises a plurality of storage pages which correspond to storage pages of the storage comprising the plurality storage of attributes. The storage pages may be based on a specific operating system or platform. In yet another embodiment, the request is sent to a centralized management agent operable to manage multiple managed hosts (e.g., virtual machines).

The process of the computer readable code further includes receiving the plurality of storage attributes from the virtual storage access module (e.g., via said virtual access path) and storing the plurality of storage attributes. In one embodiment, the storing is operable to store the plurality of storage attributes such that the plurality of storage attributes is available for use in storage management tasks. In one embodiment, the method further includes presenting (e.g., via a graphical user interface (GUI)) the plurality of storage attributes for facilitating storage management of the virtual storage access module.

DETAILED DESCRIPTION

Figure 1:
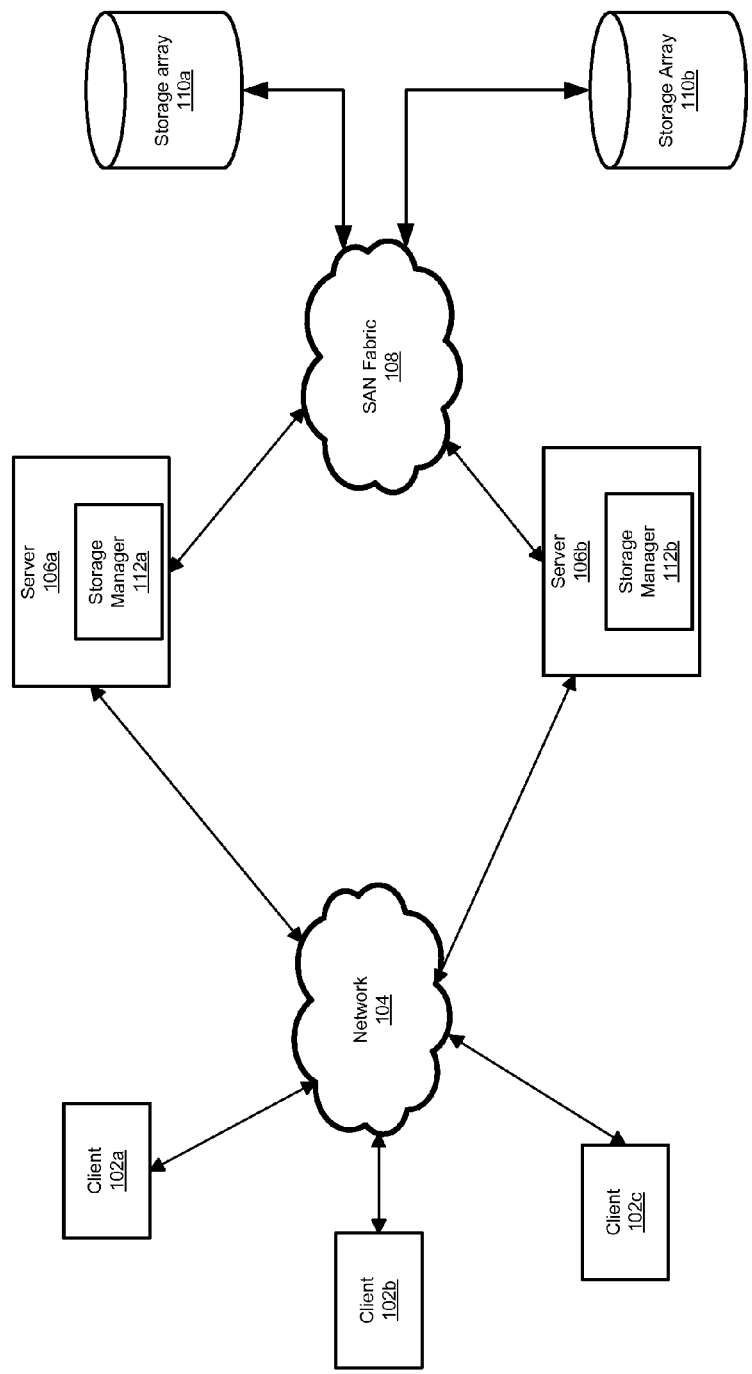
FIG. 1 shows a block diagram of an exemplary operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "deactivating," "disabling," "freezing," "re-activating," "enabling," "thawing," "sending," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment, in accordance with one embodiment of the present invention. Exemplary operating environment 100 includes clients 102a-c, networks 104, servers 106a-b, storage area network (SAN) fabric 108, and storage arrays 110a-b. It is appreciated that that components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via servers 106a-b using, for example, a web browser or other suitable client communication software (not shown). FIG. 1 depicts the use of a network 104 such as the Internet for exchanging data, but the present disclosure is not limited to the Internet or any particular network-based environment.

Each of servers 106a-b can have multiple clients (e.g., clients 102a-c) connected thereto. Servers 106a-b can be a variety of server types including, but not limited to, database servers, network file system (NFS) servers, and application servers (e.g., billing). For example, applications and servers might have thousands of people accessing them from different locations, thus the applications and servers need to be highly available and the cluster fault tolerant. In some embodiments, servers 106a-b have access to shared storage of storage arrays 110a-b with each of servers 106a-b having its own respective clustered file system and its own built-in lock manager thereby allowing servers 106a-b to access the shared storage. Each of servers 106a-b may communicate with each other over a network (e.g., a redundant private network) (not shown). Servers 106a-b may be linked to storage arrays 110a-b in a variety of ways including, fibre channel.

Servers 106a-b respectively execute storage managers 112a-b which manage storage of storage arrays 110a-b. In one embodiment, storage managers 112a-b operate via virtualization layer of servers 106a-b and storage managers 112a-b collect storage specific information (e.g., about storage arrays 110a-b) to perform storage management tasks. For example, the storage specific information may be used to allocate portions of storage arrays 110a-b to ensure availability of storage in case of a failure.

Storage Information Accessibility in Virtual Environments

Embodiments of the present invention make storage attributes concerning storage resources available to virtual machines in virtual environments. More specifically, embodiments make attributes available via virtual access paths that would otherwise only be available via physical access paths. The availability of the storage attributes enables storage management (e.g., storage allocation) to be performed from within a virtual environment (e.g., via a virtual machine). Embodiments further allow virtual machines to handle changes (e.g., migration) from the physical access to virtual access path seamlessly thereby matching performance when operating via a physical access path. Embodiments allow thus virtual environments to have the same storage management abilities as physical environments.

Figure 2:
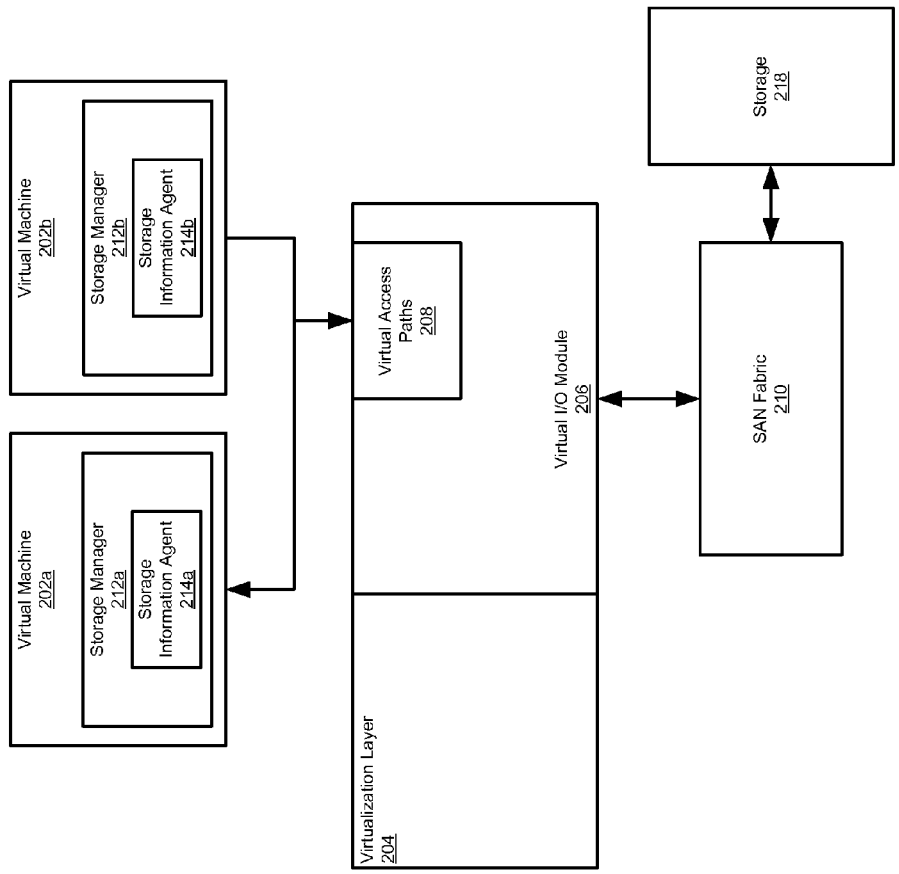
FIG. 2 shows a block diagram of another exemplary operating environment, in accordance with one embodiment of the present invention.

FIG. 2 shows a block diagram of another exemplary operating environment, in accordance with one embodiment of the present invention. Exemplary operating environment 200 includes virtual machines 202a-b, virtualization layer 204, physical access path 218, and SAN fabric 210.

Virtualization layer 204 includes virtual input/output (I/O) module 206 which handles I/O for virtualization layer 204. Virtualization layer 204 provides virtualization functionality (e.g., virtual devices to interface with) for the virtual machines 202a-b. In one embodiment, virtualization layer 204 allows various storage management in a centralized manner and also allows a single instance of software to manage storage array support, hardware reconfigurations, and balance I/O loads (e.g., class of service) across multiple virtual machines (e.g., virtual machines 202a-b) or operating systems. Storage 218 is exported to the virtual machines 202a-b via virtual access paths 208.

Virtual I/O module 206 handles I/O requests from virtual machines 202a-b and provides access to storage 218 via SAN fabric 210. In one embodiment, virtual I/O module 206 provides access to storage resources for virtual machines 202a-b via virtual access paths 208.

Virtual machines 202a execute storage managers 212a-b respectively. Storage managers 212a-b include storage information agents 214a-b respectively. Generally speaking, storage information agents 214a-b discover the storage (e.g., enclosure) specific attributes in virtual environments. Storage information agents 214a-b obtain storage attributes which would otherwise not be available as such storage attributes are virtualized (e.g., hidden) by virtual I/O module 206. Storage information agents 214a-b make the storage attributes available to storage managers 212a-b, respectively. In one embodiment, storage information agents 214a-b make the storage information available to the operating systems (not shown) of virtual machines 202a-b, respectively. The information obtained by storage information agents 214a-b allows virtual access paths 208 to act as a transport mechanism to access the devices of storage 218.

For example, by providing storage attributes of storage accessible via virtual access paths 208, a virtual machine (e.g., virtual machines 202a-b) can migrate from one physical system to another (e.g., for consolidation of servers to reduce power consumption), without loss of connectivity to the storage as the storage device appears the same to the virtual machine. That is, the storage attributes allow the virtual machine to seamlessly manage the change in routing of the I/O during migration.

Storage information agents 214a-b may store a variety of storage attributes including, device identifier (ID), enclosure identifier (e.g., storage array name, cabinet serial number), type of storage (e.g., storage array manufacturer), storage media type (e.g., solid state drive (SSD), thin, virtual volume, etc.), reliability (e.g., redundant array of inexpensive disks (RAID) type), redundancy (e.g., mirror, replication, RAID type, primary storage, or snapshot storage), connectivity, and location. In a SCSI configuration, storage volumes exported by a storage array are referred to as logical units and represented by logical unit numbers. In one embodiment, the storage attributes correspond to attributes of a logical unit number (LUN). For example, a LUN could have a replication link (e.g., Symmetrix Remote Data Facility (SRDF)) thereby having accessibility on the remote side. In one embodiment, the storage attributes in addition to physical storage attributes include volume attributes for embodiments where volume management is handled via virtualization layer 204.

Advantageously, the storage attributes made available by storage information agents 214a-b allows a variety of storage management functions to be performed via storage managers 212a-b. The availability of the storage attributes allows storage management to be based on the requirements of the application with which the storage is being used. The storage attributes further allow intelligent allocation of storage to be made. The storage management functionality supported in virtual environments includes failure domain allocation and enclosure separation, dynamic storage tiering, and device naming.

In one embodiment, the storage attributes facilitate enclosure separation and allocation of failure domains or groups. As storage arrays or enclosures may potentially fail (e.g., power loss, connectivity loss, etc.), it is desirable to select storage arrays based on their location such that storage mirrors or other redundant functionality are in separate locations. In selecting storage for allocation to failure domains, the storage attributes from storage information agents 214a-b allow portions (e.g., LUNs) of different storage arrays to be allocated to different failure domains or groups as the storage attributes indicate which portions of storage are from each enclosure or location (e.g., campus cluster information). For example, storage administrators may select LUNs from two different enclosures, thereby allowing access to one enclosure if there is a failure in the other enclosure. The storage attributes may further include information to support configuration database distribution across the failure groups and site detection in campus cluster environments.

The storage attributes may further be used for dynamic storage tiering as the storage attributes may be used to construct different tiers and differentiate between the teirs based on different sets of reliability and performance. It is appreciated that storage information agents 214a-b facilitate dynamic storage tiering which would otherwise not normally be possible via virtual access paths 208.

In one embodiment, the storage attributes visible via storage information agents 214a-b enhance usability of the storage by including physical storage names (e.g., based on enclosure based naming (EBN) and array volume ID). In accordance with embodiments of the present invention, the visibility of the physical storage names thus allows names of storage volumes (e.g., LUNs) visible by virtual machines 202a-b to be the consistent with computing systems coupled to storage 218. For example, storage may be managed by a storage administrator while servers are administered by server administered and the use of consistent storage names facilitates easy identification of storage devices during communication between the server administrator and the storage administrator (e.g., for troubleshooting, allocation of LUNs, and provisioning of storage). The storage names may include a variety of information including the type of LUN. In one embodiment, the storage attributes include host independent identifiers.

Figure 3:
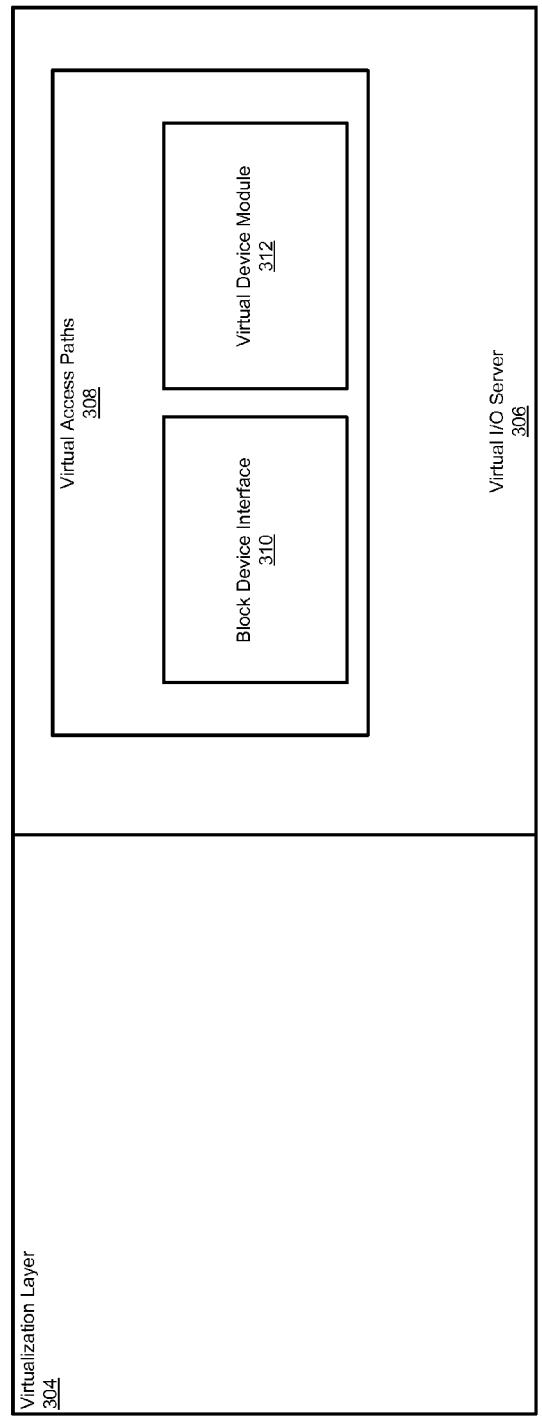
FIG. 3 shows a block diagram of exemplary components in a virtual I/O module, in accordance with one embodiment of the present invention.

FIG. 3 shows a block diagram of exemplary components in a virtual I/O module, in accordance with one embodiment of the present invention. Exemplary virtual environment 300 includes virtualization layer 304 which includes virtual I/O module 306. Virtual I/O module 306 includes virtual access paths 308 (e.g., which provide virtual machines 202a-b access to storage).

Virtual environments may have multiple ways of exporting devices to a virtual machine. In one embodiment, virtual access paths 308 include block device interface 310. Block device 310 is used by virtual I/O module via virtual access paths 308 to provide access to storage (e.g., via SAN fabric 210). Block device 310 provides a virtualized interface which virtualizes the storage thereby hiding storage specific information. In another embodiment, virtual access paths 308 include virtual device module 312. Virtual device module 312 responds to commands (e.g., small computer system interface (SCSI) commands) with virtual data thus hiding storage specific information.

Figure 4:
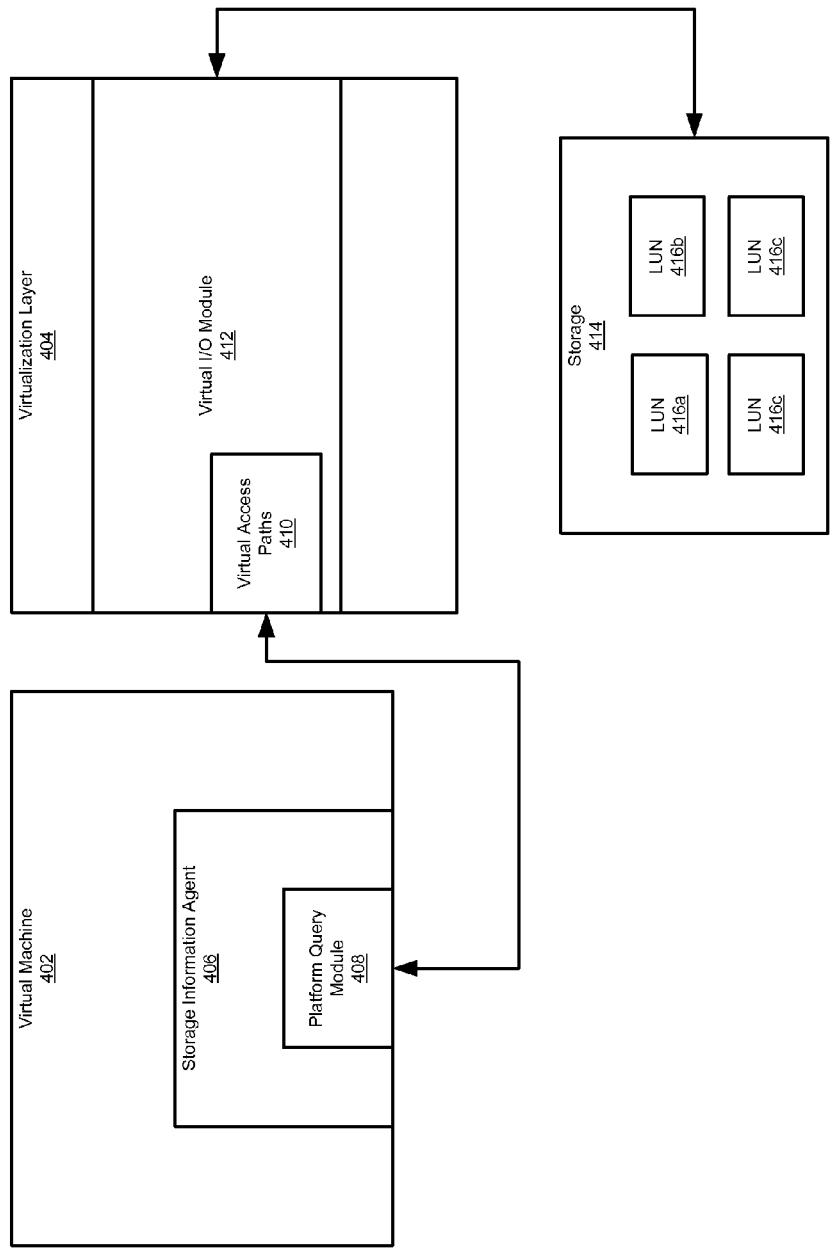
FIG. 4 shows a block diagram of an exemplary virtual environment where storage information is determined based on platform specific queries, in accordance with another embodiment of the present invention.

FIG. 4 shows a block diagram of an exemplary virtual environment where storage information is determined based on platform specific queries, in accordance with one embodiment of the present invention. Exemplary virtualized system 400 includes virtual machine 402, virtualization layer 404, and storage 414.

Virtualization layer 404 includes virtual I/O module 412 which provides access to storage 414. Virtual I/O module 412 provides virtual machine 402 access to storage 414 via virtual access paths 410. Storage 414 includes Logical Unit Numbers (LUNs) 416a-d which represent storage volumes (e.g., in a SCSI configuration). It is appreciated that embodiments of the present invention may operate with other storage configurations.

Virtual machine 402 executes storage information agent 406. In one embodiment, storage information agent 406 includes platform query module 408. Platform query module 408 queries specific inquiry pages of the storage available via virtual access paths 410 based on the operating system/platform of virtualization layer 402. The queries from platform query module 408 may include specific inquiry pages which virtual I/O module 412 responds with information (e.g., storage attributes) stored on the corresponding inquiry pages of storage 414. For example, certain platforms may provide specific SCSI inquiry pages which provide information about the backend device (e.g., storage 414). Storage information agent 406 can thus use platform query module 408 to obtain useful storage information about the LUNs backed by physical storage. As another example, in an Advanced Interactive eXecutive (AIX) environment, commercially available from International Business Machines of Armonk, New York, a query from platform query module 408 of pages 0xFF, 0xFE, and 0xFD returns data from pages 83, 80, 0 of storage 414 from virtual I/O module 412 which includes storage information. It is appreciated that in some embodiments, storage attributes are received via virtual access paths 410.

Figure 5:
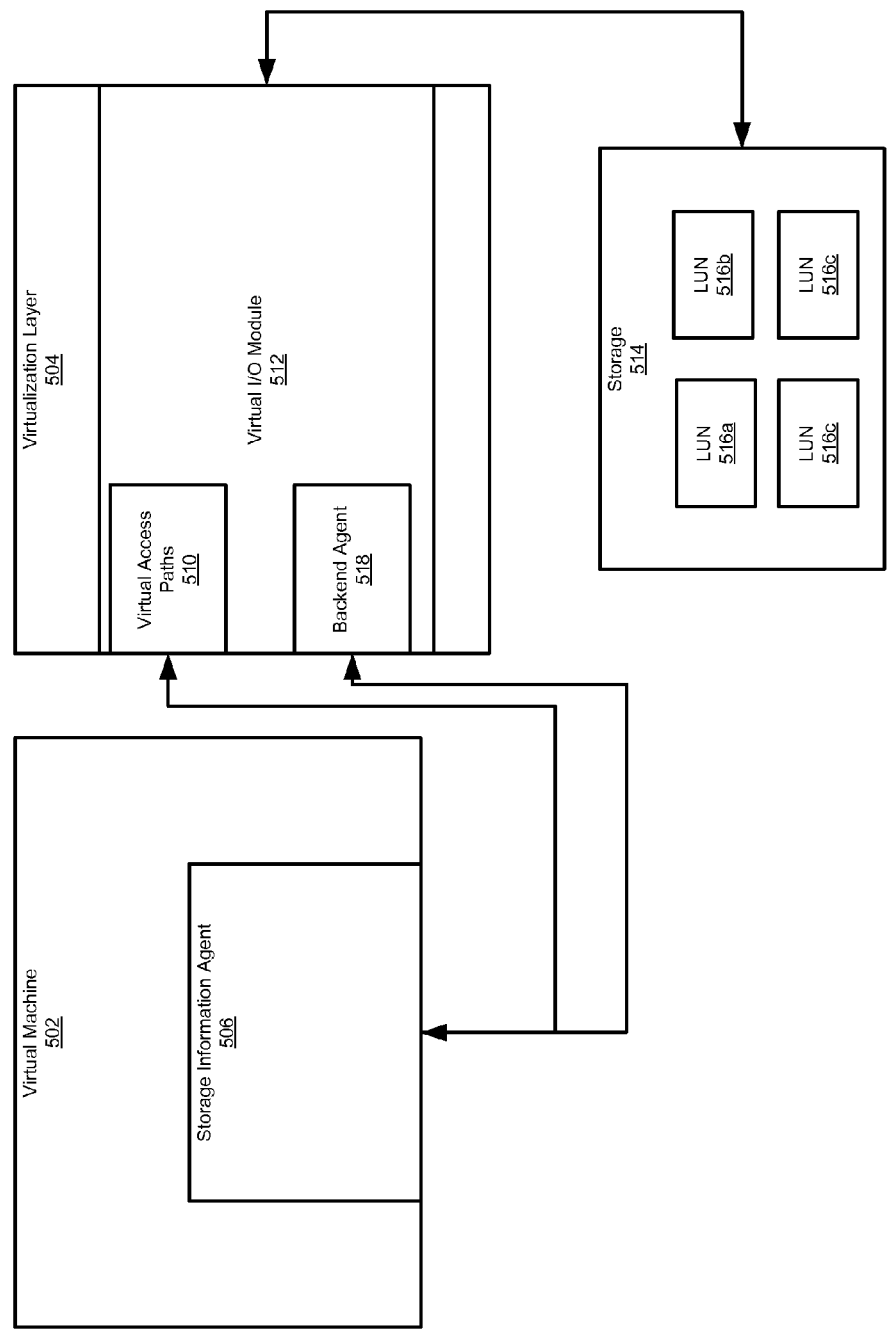
FIG. 5 shows a block diagram of another exemplary virtual environment where storage information is determined based on communication with a backend agent, in accordance with another embodiment of the present invention.

FIG. 5 shows a block diagram of another exemplary virtual environment where storage information is determined based on communication with a backend agent, in accordance with another embodiment of the present invention. Exemplary virtualized system 500 includes virtual machine 502, virtualization layer 504, and storage 514.

Virtualization layer 504 includes virtual I/O module 512 which provides access to storage 514. Virtual I/O module 512 provides virtual machine 502 access to storage 514 via virtual access paths 510. Storage 514 includes Logical Unit Numbers (LUNs) 516a-d which represent storage volumes (e.g., in a SCSI configuration). It is appreciated that embodiments of the present invention may operate with other storage configurations.

Virtual machine 502 executes storage information agent 506. In one embodiment, storage information agent 506 is communicatively coupled to backend agent 518 of virtual I/O module 512. In one embodiment, storage information agent 506 establishes a communication channel with backend agent 518 to obtain storage attributes from backend agent 518. It is appreciated that storage information agent 506 and backend agent 518 may operate in a variety of well known ways including a client/server mode respectively.

In one embodiment, backend agent 518 responds to specific instructions (e.g., input/output control (ioctl) or I/O on a configuration device) from storage information agent 506 and provides storage attributes about the actual storage (e.g., LUNs 516a-d). Backend agent 518 can also provide storage attributes for LUNs backed by virtual volumes in the virtualization layer 504. In one embodiment, backend agent 518 is used when virtual I/O module 512 includes a block device interface (e.g., block device interface 310). Backend agent 518 can further obtain storage information from storage 514 (e.g., by querying storage 514), correlate the storage information with the virtual devices accessible via virtual access paths 510, and provide the storage attributes to storage information agents 506a-c.

Figure 6:
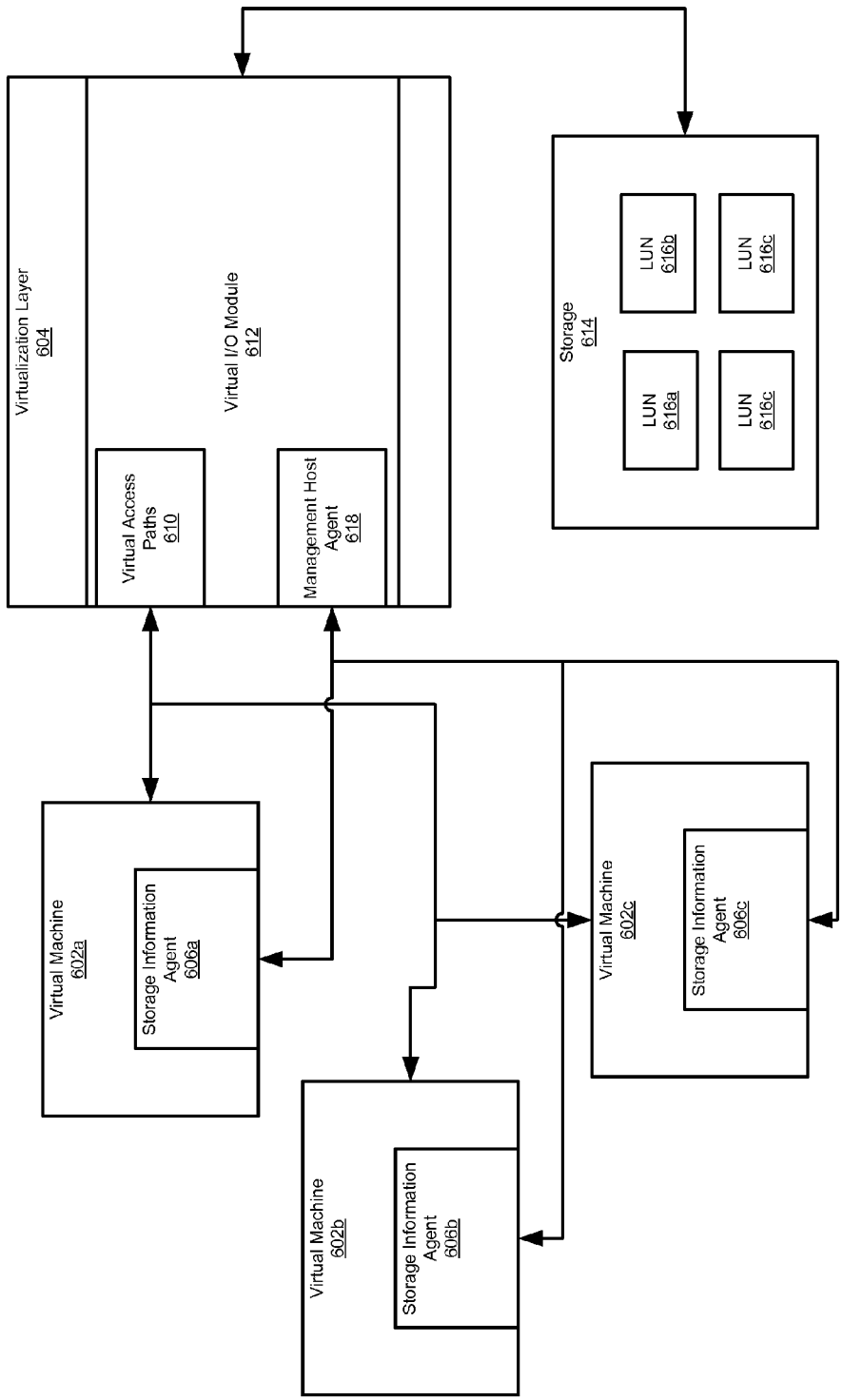
FIG. 6 shows a block diagram of an exemplary virtual environment including managed hosts and a management host, in accordance with one embodiment of the present invention.

FIG. 6 shows a block diagram of another exemplary virtual environment including managed hosts and a management host, in accordance with another embodiment of the present invention. Exemplary virtualized system 600 includes virtual machines 602a-c, virtualization layer 604, and storage 614.

Virtualization layer 604 includes virtual I/O module 612 which provides access to storage 614. Virtual I/O module 612 provides virtual machines 602a-c access to storage 614 via virtual access paths 610. Storage 614 includes Logical Unit Numbers (LUNs) 616a-d which represent storage volumes (e.g., in a SCSI configuration). It is appreciated that embodiments of the present invention may operate with other storage configurations.

Virtual machine 602a-c executes storage information agents 606a-c. In one embodiment, storage information agents 606a-c are communicatively coupled to management host agent 618 of virtual I/O module 612. In one embodiment virtual machines 602a-c are managed hosts managed by management host agent 618. Management host agent 618 may manage a variety of activities including reporting and control activities among virtual machines 602a-c. It is appreciated that virtual machines 602a-c may operate on a single physical computing system or multiple physical computing systems. It is further appreciated that management host agent 618 may be on a separate physical computing system from virtual machines 602a-c.

Storage information agents 606a-c may request storage attributes from management host agent 618. Management host agent 618 can obtain storage information from storage 614 (e.g., by querying storage 614), correlate the storage information with the virtual devices accessible via virtual access paths 610, and provide the storage attributes to storage information agents 606a-c. It is appreciated that management host agent 618 may perform the correlation for LUNs of physical storage (e.g., storage 614) and for volumes accessible via virtual access paths 610.

Figure 7:
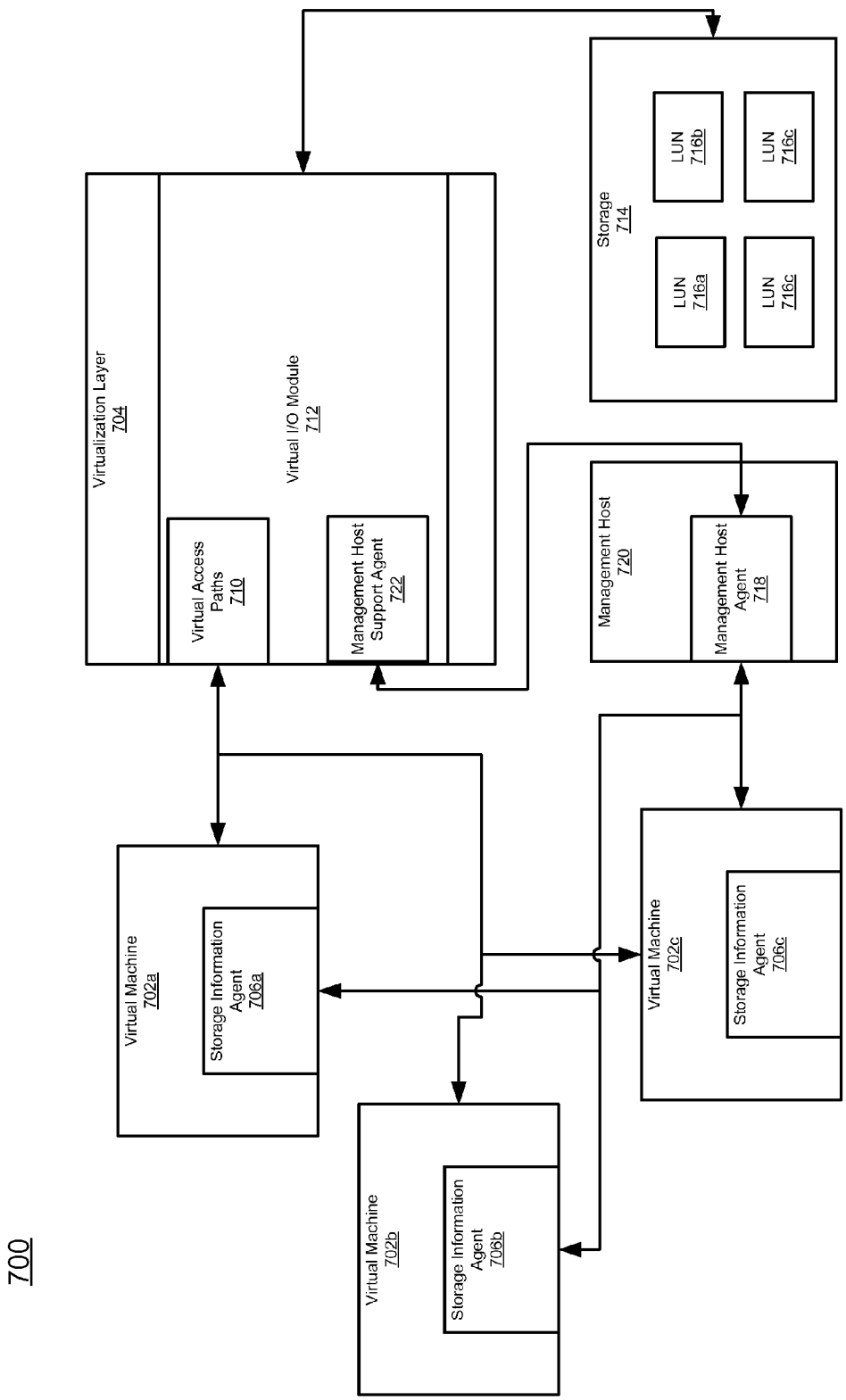
FIG. 7 shows a block diagram of an exemplary virtual environment including managed hosts and a management host separate from a virtual I/O module, in accordance with one embodiment of the present invention.

FIG. 7 shows a block diagram of an exemplary virtual environment including managed hosts and a management host separate from a virtual I/O module, in accordance with one embodiment of the present invention. In one embodiment, exemplary virtual environment 700 is similar to exemplary virtual environment 600. For example, virtual machines 702a-c, virtualization layer 704, and storage 714 are similar to virtual machines 602a-c, virtualization layer 604, and storage 614. Except management host agent 718 is included in management host 720 which is separate from virtual I/O module 712 and virtual I/O module 712 includes management host support agent 722.

Management host 720 includes management host agent 718 which obtains storage information via management host support agent 722 of virtual I/O module 712. Management host 720 may be on a separate computing system (e.g., one of servers 106a-b) or separate virtualization layer (e.g., separate from virtualization layer 704) from virtual I/O module 712. Management host agent 718 may request storage attributes (e.g., LUN attributes and device IDs) from management host support agent 722 which in turn requests storage attributes from storage 714. In one embodiment, management host agent 718 may use received storage attributes to perform correlation based on device IDs.

Figure 8:
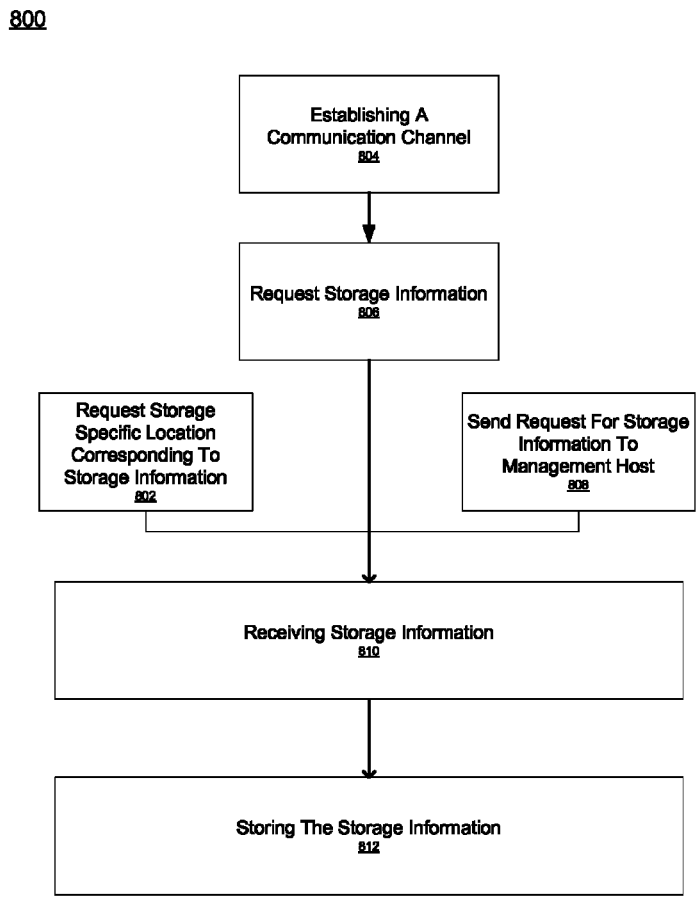
FIG. 8 shows an exemplary flowchart of processes for accessing storage information in virtual environments, in accordance with embodiments of the present invention.
Figure 9:
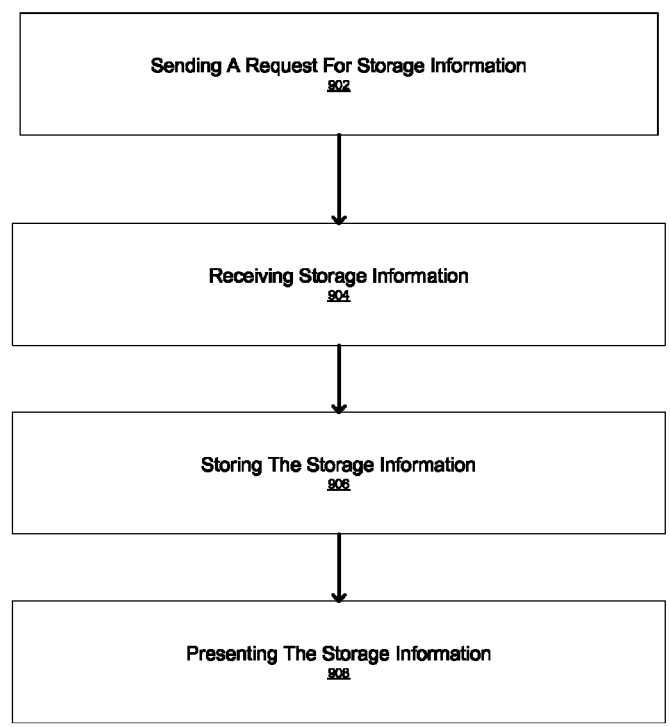
FIG. 9 shows an exemplary flowchart of another process for making storage information accessible in a virtual environment, in accordance with another embodiment of the present invention.

With reference to FIGS. 8 and 9, exemplary flowcharts 800 and 900 illustrate example processes used by various embodiments of the present invention. Although specific blocks are disclosed in flowcharts 800 and 900, such blocks are exemplary. That is, embodiments are well suited to performing various other blocks or variations of the blocks recited in flowcharts 800 and 900. It is appreciated that the blocks in flowcharts 800 and 900 may be performed in an order different than presented, and that not all of the blocks in flowcharts 800 and 900 may be performed. Flowcharts 800 and 900 include processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 8 shows an exemplary flowchart of processes for accessing storage information in a virtual environment, in accordance with embodiments of the present invention.

At block 802, storage specific locations in inquiry pages corresponding to storage information (e.g., storage attributes) are requested. As described herein, a storage information agent of a virtual machine may issue requests (e.g., including specific inquiry pages) to a virtual I/O module which responds with the information of those pages which include storage attributes. Block 810 may then be performed.

At block 804, a communication channel is established. As described herein, the communication channel may be established between a virtual machine (e.g., a storage information agent) and a virtual I/O module (e.g., including a backend agent).

At block 806, a request for information is made. As described herein, the request may be made to a component (e.g., backend agent 518) of a virtual I/O module (e.g., virtual I/O module 512) for storage attributes. Block 810 may then be performed.

At block 808, a request for storage information is made to a management host. As described herein, a storage information agent may request storage attributes from a management host agent (e.g., management host agent 618).

At block 810, storage information is received. As described herein, the storage information comprises storage attributes including device names, reliability, physical enclosure properties and redundancy information.

At block 812, the storage information is stored. As described herein, the storage information is stored such that is available for use in performing storage management tasks within a virtual environment (e.g., from a virtual machine).

FIG. 9 shows an exemplary flowchart of another process for making storage information accessible or visible in a virtual environment, in accordance with another embodiment of the present invention.

At block 902, a request for storage information is sent from a virtual machine. As described herein, the request may be from storage information agent to enable access to storage attributes for the virtual machine.

At block 904, storage information is received. As described herein, the storage information may be from a virtual I/O module and include a variety of storage attributes which are operable for use in managing storage from a virtual machine.

At block 906, the storage information is stored. As described herein, the storage information may be storage such that it is accessible via a storage management application (e.g., volume and allocation management, dynamic storage tiering, or failure group application) operating in a virtual machine.

At block 909, the storage information is presented for use in storage management tasks. In one embodiment, the storage information is presented via a graphical user interface for performing storage management tasks.

Figure 10:
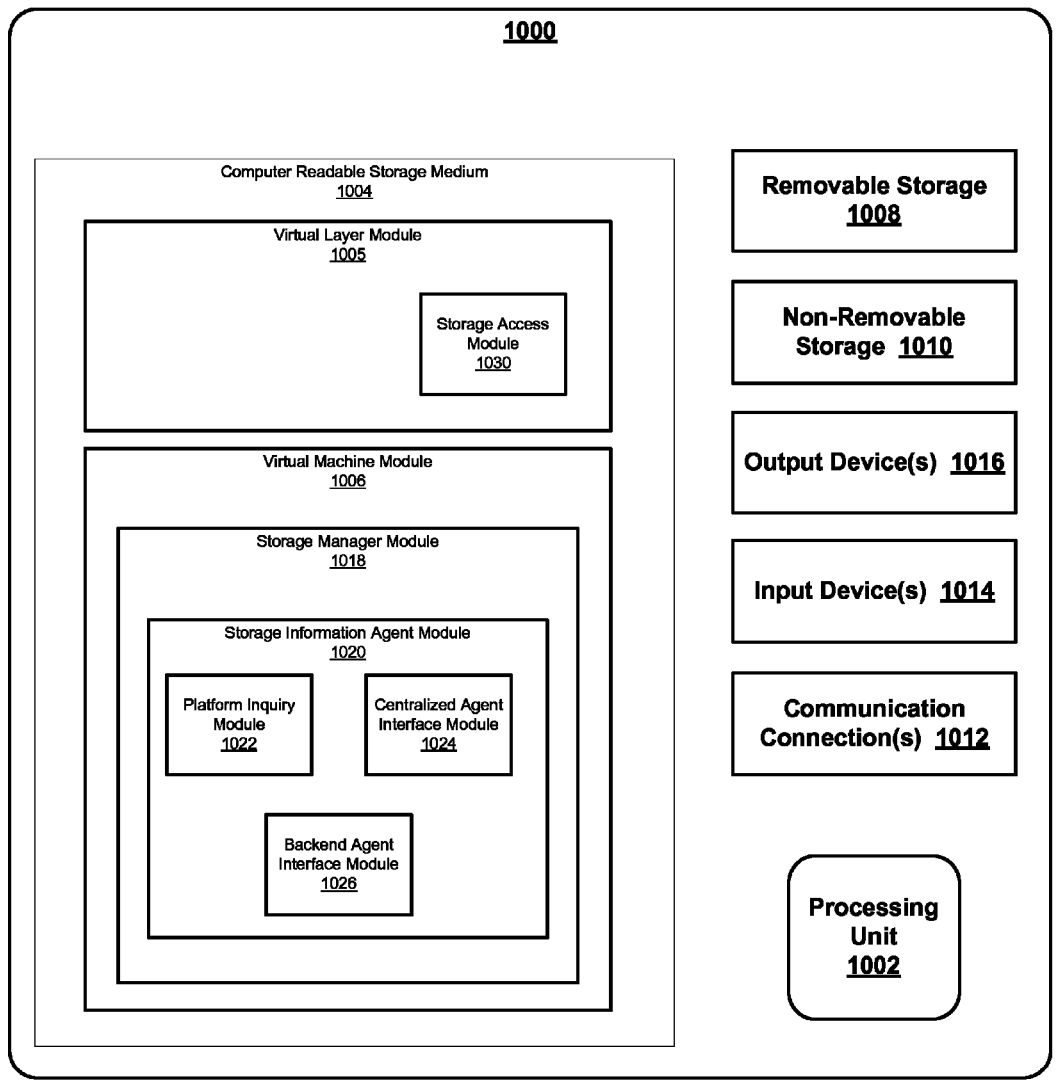
FIG. 10 shows a block diagram of an exemplary computer system, in accordance with one embodiment of the present invention.

FIG. 10 shows a block diagram of an exemplary computer system module 1000, in accordance with one embodiment of the present invention. With reference to FIG. 10, an exemplary system module for implementing embodiments includes a general purpose computing system environment, such as computing system environment 1000. Computing system environment 1000 may include, but is not limited to, servers (e.g., servers 106a-b), desktop computers, laptops, tablet PCs, mobile devices, and smartphones. In its most basic configuration, computing system environment 1000 typically includes at least one processing unit 1002 and computer readable storage medium 1004. Depending on the exact configuration and type of computing system environment, computer readable storage medium 1004 may be volatile (such as RAM), non-volatile (such as ROM, flash memory, etc.) or some combination of the two. Portions of computer readable storage medium 1004 when executed perform selection of failover targets (e.g., processes 700 and 800).

Additionally, computing system environment 1000 may also have additional features/functionality. For example, computing system environment 1000 may also include additional storage (removable and/or non-removable) including, but not limited to, magnetic or optical disks or tape. Such additional storage is illustrated in FIG. 10 by removable storage 1008 and non-removable storage 1010. Computer storage media includes volatile and nonvolatile, removable and non-removable media implemented in any method or technology for storage of information such as computer readable instructions, data structures, program modules or other data. Computer readable medium 1004, removable storage 1008 and nonremovable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 1000. Any such computer storage media may be part of computing system environment 1000.

Computing system environment 1000 may also contain communications connection(s) 1012 that allow it to communicate with other devices. Communications connection(s) 1012 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 1012 may allow computing system environment 1000 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 1012 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 1000 may also have input device(s) 1014 such as a keyboard, mouse, pen, voice input device, touch input device, remote control, etc. Output device(s) 1016 such as a display, speakers, etc. may also be included. All these devices are well known in the art and are not discussed at length.

In one embodiment, computer readable storage medium 1004 includes virtualization layer module 1005, and virtual machine module 1006. Virtualization layer module 1005 includes storage access module 1030. Storage access module 1030 provides access to storage for virtual machine module 1006 (e.g., via virtual access paths).

In one embodiment, virtual machine module 1006 executes as a virtual machine. Virtual machine module 1006 includes storage manager module 1018. Storage manager module 1018 facilitates performance of storage management tasks (e.g., dynamic storage tiering, storage allocation, etc.). Storage manager module 1018 includes storage information agent module 1020 which allows storage manager module 1018 to perform storage managements tasks by providing storage information when the storage manager module 1018 is used in a virtualization environment. It is appreciated that storage information agent module 1020 may be independent or separate from storage management module 1018.

In one embodiment, storage information module 1020 includes platform inquiry module 1022, centralized agent interface module 1024, and backend agent interface module 1026. As described herein, platform query module 1022 may make specific queries to storage access module 1030 (e.g., virtual I/O module) for storage attributes. Centralized agent interface module 1024 may obtain storage attributes by making a request to a centralized agent (e.g., management host agent 618). Backend agent interface module 1026 may obtain storage attributes by requesting storage attributes from an agent of storage access module 1030 (e.g., backend agent 518).

Thus, embodiments of the present invention provide a method and system for making storage attributes (e.g., storage device specific information) available to virtual machines in a virtual environment. Embodiments utilize a variety of methods including platform specific queries and queries to virtual storage access modules to bring storage information to virtual machines.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of providing storage information comprising:
sending a request, by a virtual machine, via an electronic system, for a plurality of storage attributes to a virtual storage access module, wherein said virtual storage access module facilitates access to storage for a said virtual machine via a virtual access path;
receiving at said virtual machine said plurality of storage attributes from said virtual storage access module, wherein at least one of said plurality of storage attributes comprises a storage identifier configured to be sent from said virtual storage access module to said storage, and wherein said virtual machine is configured to use said plurality of storage attributes to migrate from a first physical system to a second physical system without a loss of connectivity to said storage; and
storing said storage attributes, wherein said plurality of storage attributes are available for use in storage management tasks performed by said virtual machine,
wherein said storage management tasks performed by said virtual machine facilitates failure domain allocation and enclosure separation, dynamic storage tiering, and device naming;
wherein said failure domain allocation and enclosure separation comprises selecting a storage array based on its location such that a storage mirror is in a separate location;
wherein said dynamic storage tiering comprises constructing different tiers of storage based on different sets of reliability and performance;
wherein said device naming comprises allowing a physical storage name of a storage volume visible by said virtual machine to be consistent with a computing system coupled to said storage.

2. The method of claim 1 further comprising:
establishing a communication channel with a backend agent of said virtual storage access module.

3. The method of claim 2 wherein said backend agent is a portion of a virtual input/output component.

4. The method of claim 1, further comprising:
presenting via a graphical user interface of said virtual machine said plurality of storage attributes for facilitating storage management.

5. The method of claim 1 wherein said request comprises a plurality of storage inquiry pages which correspond to storage inquiry pages of said storage comprising said plurality storage of attributes.

6. The method of claim 5 wherein said storage inquiry pages are based on at least one of an operating system or hardware platform.

7. The method of claim 1 wherein said virtual storage access module comprises a centralized management agent, and wherein said request is sent to said centralized management agent and said centralized management agent is operable to manage multiple managed hosts.

8. The method of claim 1 wherein said plurality of storage attributes comprises attributes of a logical unit number (LUN).

9. A non-transitory computer readable storage medium having stored thereon, computer executable instructions that, if executed by a computer system cause the computer system to perform a method of providing storage information comprising:
sending a request, by a virtual machine, via an electronic system, for a plurality of storage attributes to a virtual storage access module, wherein said virtual storage access module facilitates access to storage for said virtual machine via a virtual access path and wherein said virtual machine executes on said computer system;
receiving at said virtual machine said plurality of storage attributes from said virtual storage access module, wherein at least one of said plurality of storage attributes comprise a storage identifier configured to be sent from said virtual storage access module to said storage, and wherein said virtual machine is configured to use said plurality of storage attributes to migrate from a first physical system to a second physical system without a loss of connectivity to said storage; and
storing said storage attributes, wherein said plurality of storage attributes are available for use in storage management tasks performed by said virtual machine,
wherein said storage management tasks performed by said virtual machine facilitates failure domain allocation and enclosure separation, dynamic storage tiering, and device naming;
wherein said failure domain allocation and enclosure separation comprises selecting a storage array based on its location such that a storage mirror is in a separate location;
wherein said dynamic storage tiering comprises constructing different tiers of storage based on different sets of reliability and performance;
wherein said device naming comprises allowing a physical storage name of a storage volume visible by said virtual machine to be consistent with a computing system coupled to said storage.

10. The non-transitory computer readable storage medium of claim 9, wherein said method further comprises:
establishing a communication channel with a backend agent of said virtual storage access module.

11. The non-transitory computer readable storage medium of claim 10, wherein said backend agent is a portion of a virtual input/output component.

12. The non-transitory computer readable storage medium of claim 9, wherein said method further comprises:

presenting via said virtual machine said plurality of storage attributes for facilitating storage management.

13. The non-transitory computer readable storage medium of claim 9, wherein said request comprises a plurality of storage inquiry pages which correspond to storage inquiry pages of said storage comprising said plurality storage of attributes.

14. The non-transitory computer readable storage medium of claim 9, wherein said storage inquiry pages are based on at least one of an operating system or hardware platform.

15. The non-transitory computer readable storage medium of claim 9, wherein said virtual storage access module comprises a centralized management agent, and wherein said request is sent to said centralized management agent and said centralized management agent is operable to manage multiple managed hosts.

16. The non-transitory computer readable storage medium of claim 9, wherein said plurality of storage attributes comprises attributes of a logical unit number (LUN).

17. A storage cluster system, comprising:
   a computer system comprising one or more processors coupled to a computer readable storage media and configurable to execute computer readable code stored on the computer readable storage media which causes the computer system to implement a method comprising:
      sending a request, by a virtual machine, via an electronic system, for a plurality of storage attributes to a virtual storage access module, wherein said virtual storage access module facilitates access to storage for said virtual machine via a virtual access path;
      receiving at said virtual machine said plurality of storage attributes from said virtual storage access module, wherein at least one of said plurality of storage attributes comprises a storage identifier configured to be sent from said virtual storage access storage module to said storage, and wherein said virtual machine is configured to use said plurality of storage attributes to migrate from a first physical system to a second physical system without a loss of connectivity to said storage; and
      storing said storage attributes, wherein said plurality of storage attributes are available for use in storage management tasks performed by said virtual machine,
      wherein said storage management tasks performed by said virtual machine facilitates failure domain allocation and enclosure separation, dynamic storage tiering, and device naming;
      wherein said failure domain allocation and enclosure separation comprises selecting a storage array based on its location such that a storage mirror is in a separate location;
      wherein said dynamic storage tiering comprises constructing different tiers of storage based on different sets of reliability and performance;
      wherein said device naming comprises allowing a physical storage name of a storage volume visible by said virtual machine to be consistent with a computing system coupled to said storage.

18. The storage cluster system of claim 17, wherein said plurality of storage attributes comprises attributes of a logical unit number (LUN).

19. The storage cluster system of claim 17 wherein said virtual storage access module comprises a centralized management agent, and wherein said request is sent to said centralized management agent and said centralized management agent is operable to manage multiple managed hosts.

20. The storage cluster system of claim 17 wherein said plurality of storage attributes are received via said virtual access path.

* * * * *